July 13, 1954     R. G. SHEIDLER ET AL     2,683,795
PORTABLE ELECTRIC COOKING OVEN
Filed June 13, 1952                         6 Sheets-Sheet 1

INVENTORS
Robert G. Sheidler
& Truman B. Clark
BY Chas. H. Trotter
Atty.

July 13, 1954 R. G. SHEIDLER ET AL 2,683,795
PORTABLE ELECTRIC COOKING OVEN
Filed June 13, 1952 6 Sheets-Sheet 2

INVENTORS
Robert G. Sheidler
& Truman B. Clark
By Chas. H. Trotter
Atty.

July 13, 1954   R. G. SHEIDLER ET AL   2,683,795
PORTABLE ELECTRIC COOKING OVEN
Filed June 13, 1952   6 Sheets-Sheet 3

INVENTORS
*Robert G. Sheidler*
*& Truman B. Clark*
By *Chas. H. Trotter*
Atty.

INVENTORS
Robert G. Sheidler
& Truman B. Clark
By Chas. H. Trotter
Atty.

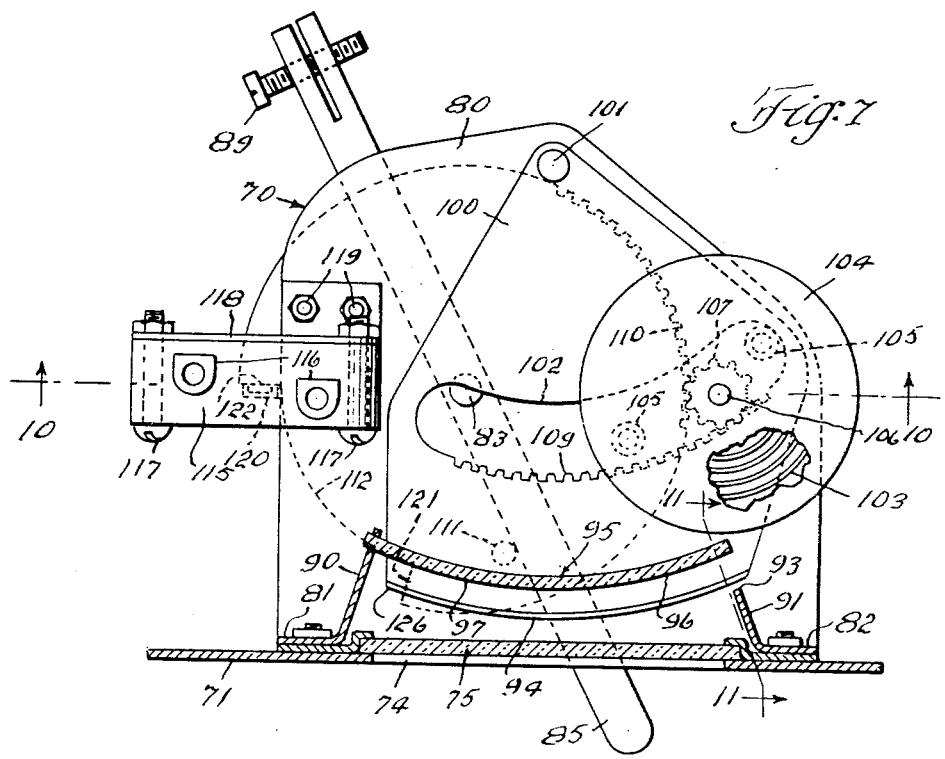
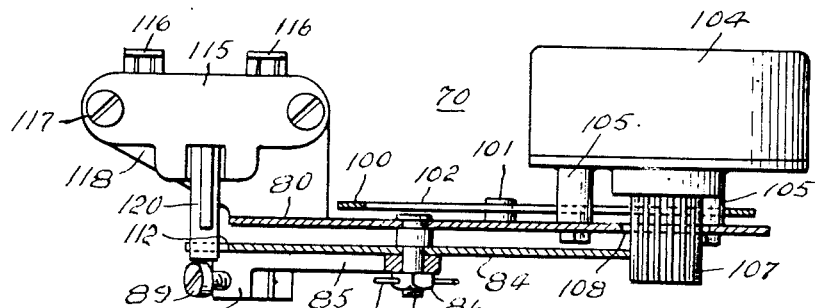
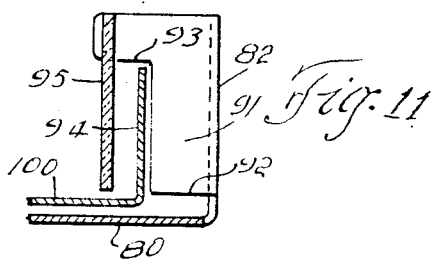

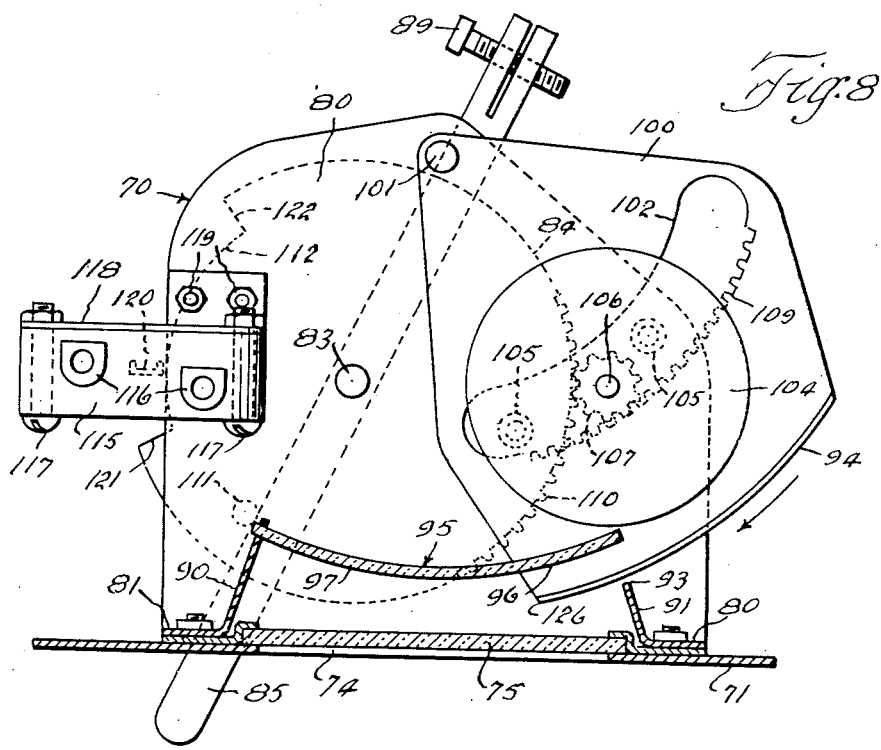
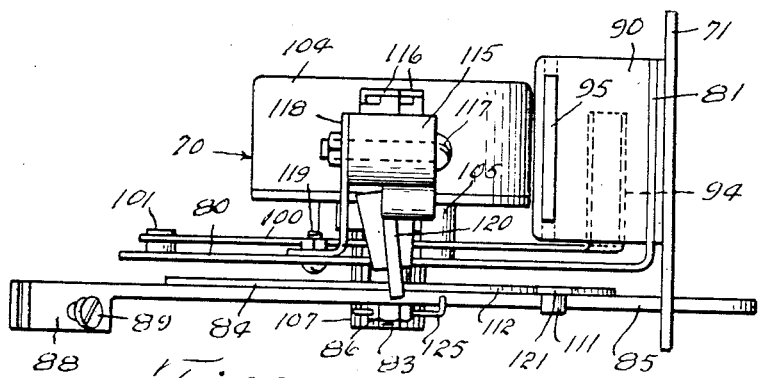

UNITED STATES PATENT OFFICE 2,683,795

PORTABLE ELECTRIC COOKING OVEN

Robert G. Sheidler and Truman B. Clark, Mansfield, Ohio, assignors to The Tappan Stove Company, Mansfield, Ohio, a corporation of Ohio Application June 13, 1952, Serial No. 293,374

1 Claim. (Cl. 219—35)

This invention relates to electric cooking ovens which are especially adapted for military use in transport airplanes when ferrying personnel from place to place. Although the oven was particularly designed for military use it is equally well adapted for civilian use.

In airplanes the size and weight of equipment is of prime importance. Everything must be highly efficient and as small and light as it is possible to make it without sacrificing efficiency. With this in mind we designed an electric oven which is highly efficient in operation and which is very compact and light in weight, but which is still capable of cooking a large quantity of food at the same time.

As constructed according to our invention the oven comprises a rectangular front frame of wood or suitable heat insulating plastic and a rear wall of wood or suitable plastic which is spaced from the front frame. A rectangular inner sheet metal tubular casing extends between the front frame and the rear wall with the forward end thereof secured to the inner periphery of the front frame and the rear end thereof secured to the outer periphery of the rear wall. The frame, rear wall and tubular casing define an oven chamber open at the forward end thereof. A door is hinged to the front frame in position to close the open end of the chamber. An outer rectangular tubular casing which is secured to the outer periphery of the front frame and extends rearwardly therefrom encloses the inner casing and the rear wall. The rear end to the outer casing is closed by a sheet metal plate which is spaced from the rear wall. The space between the inner and outer casings and behind the rear wall is filled with suitable insulating material. The outer casing also encloses an upper compartment above the oven chamber.

A plurality of vertically spaced trays are removably mounted in the oven chamber upon suitable tracks which are secured to the sides of the inner casing and extend from the front to the rear of the chamber. The tracks, intermediate the ends thereof, are spaced from the sides of the inner casing to permit the upward flow of vapor. Each tray has incorporated therein an electric resistance heating element which is connected to suitable plugs carried by the tray and which engage suitable outlet sockets mounted in the rear wall when the tray is in place. The energization of the heating element is controlled by a standard electric switch which is constructed to be manually closed and automatically opened by a thermally responsive element which is subject to the temperature of the oven chamber.

In airplanes it is essential that no vapors, which might condense on and befog the control instruments, be allowed to escape into the airplane. To this end we provide a substantially vapor tight condenser in the upper compartment which is connected to the upper end of the oven chamber by a vertical conduit. The condenser is in the form of an elongated closed removable receptacle having a plurality of spaced transverse baffles therein. During use vapors created in the oven will flow up through the conduit into the condenser and condense on the baffles. The condenser should be removed and emptied after each use of the oven to insure maximum efficiency thereof.

An indicating mechanism is also mounted in the upper compartment in position to be visible through a window in the front wall of the upper compartment. By this indicating mechanism one can tell at a glance how long food in the oven chamber has been cooking, how long it will be until the food is properly cooked, and how long the food has been properly cooked. The indicator is set in operation by the manual closing of the control switch.

The oven is adapted to simultaneously cook a great variety of different foods or combinations of food. In use the different foods are put in separate containers which are placed upon the trays in the oven chamber. The control switch is then closed by the manual actuation of a lever which extends out through a slot in the front wall of the upper compartment. The actuation of this lever in closing the control switch also sets the indicator mechanism in operation. When the temperature in the oven chamber reaches a predetermined degree in accordance with the setting of the control switch the control switch is automatically opened by the thermally responsive element which is operatively connected to the control switch. But although the heating elements have been de-energized by the opening of the control switch the food in the oven will continue to cook until properly done. It is to be understood that the different foods being cooked at the same time must be carefully selected so that all will require the same cooking time at the same temperature. Many such combinations of food are possible.

The principal object of the invention is to provide a small compact light weight electric cooking oven which is highly efficient and is capable of simultaneously cooking a large quantity of the same or different foods.

Another object of the invention is to provide in an oven of the aforesaid character means to condense all vapors being generated therein during use.

Another object of the invention is to provide an oven of the aforesaid type having an indicating and control mechanism incorporated therein by which one can tell at a glance how long food in the oven has been cooking, how long it will be until the food is properly cooked, and how long the food has been properly cooked.

Other and more limited objects of the invention will be apparent from the following specification and the accompanying drawings forming a part thereof wherein:

Fig. 7 is an enlarged plan view of the indicating mechanism removed from the oven showing the various parts thereof in inoperative position;

Fig. 8 is a view similar to Fig. 7 showing the various parts of the indicating mechanism in operative position;

Fig. 9 is a side elevation of the indicating mechanism as viewed from the left of Fig. 7;

Fig. 10 is a vertical section taken substantially on the line 10—10 of Fig. 7; and Fig. 11 is a detail section on the line 11—11 of Fig. 7.

Figure 1:
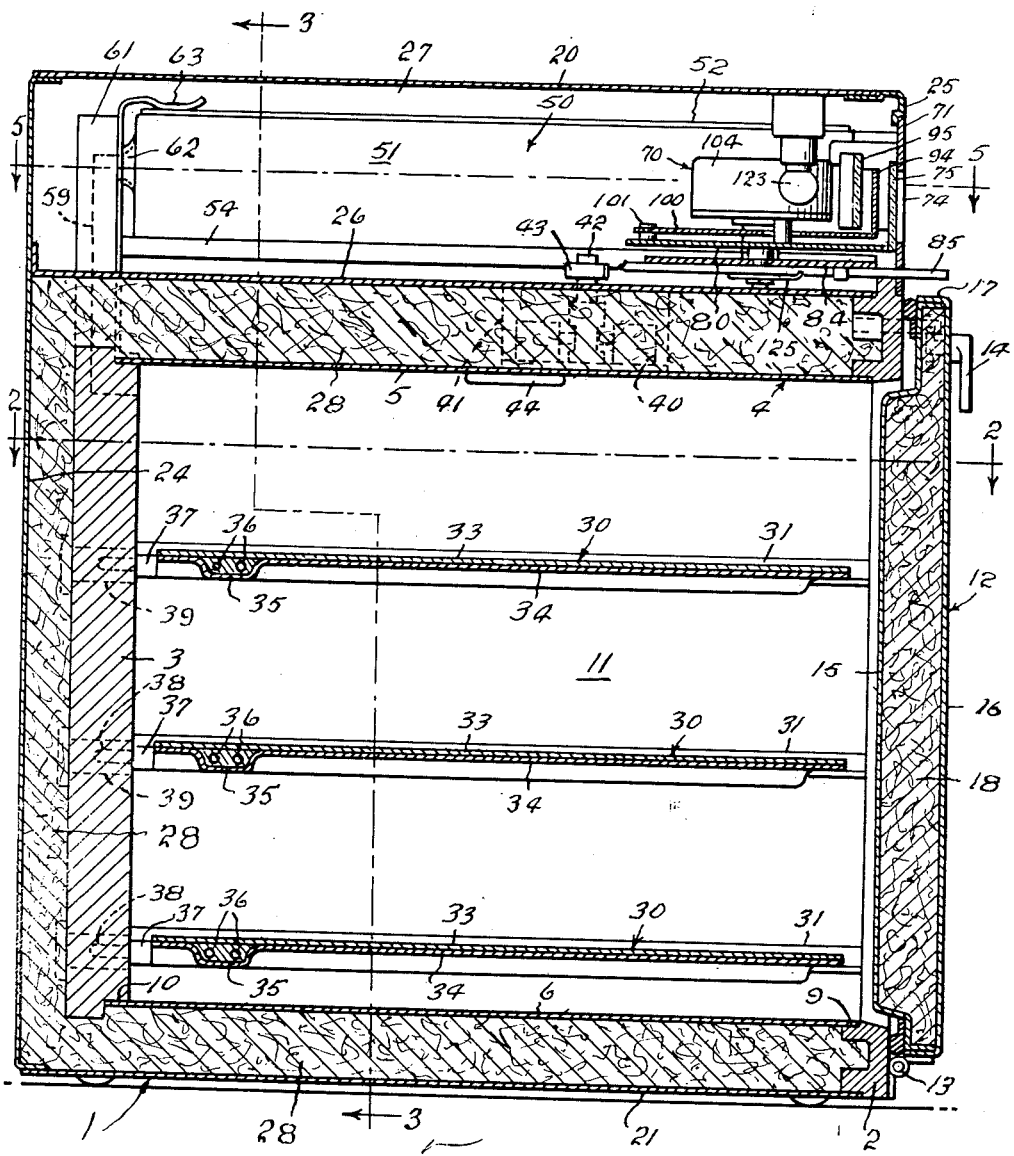
Fig. 1 is a vertical section from the front to the back of an oven constructed according to our invention, the plane of the section being indicated by the line 1—1 on Fig. 5.
Figure 3:
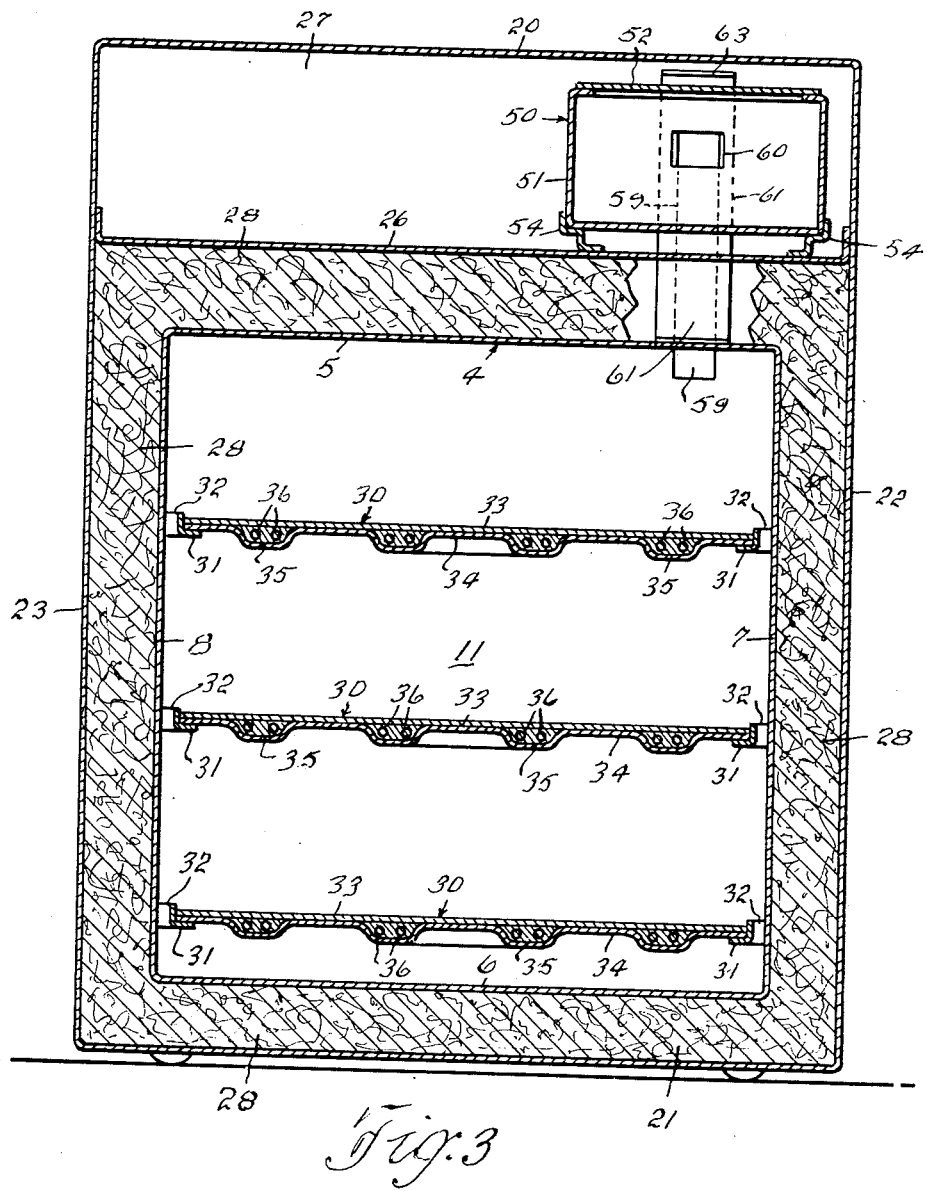
Fig. 3 is a vertical transverse section taken on the line 3—3 of Figs. 1 and 5.
Figure 2:
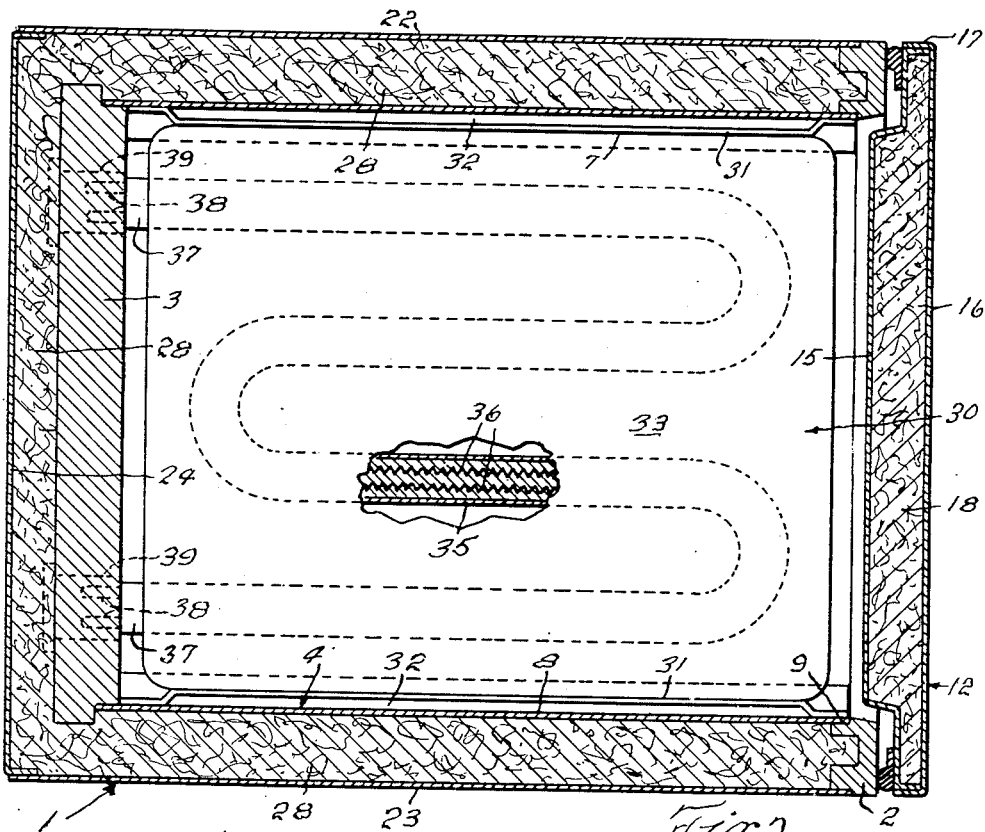
Fig. 2 is a horizontal section taken on the line 2—2 of Fig. 1.
Figure 4:
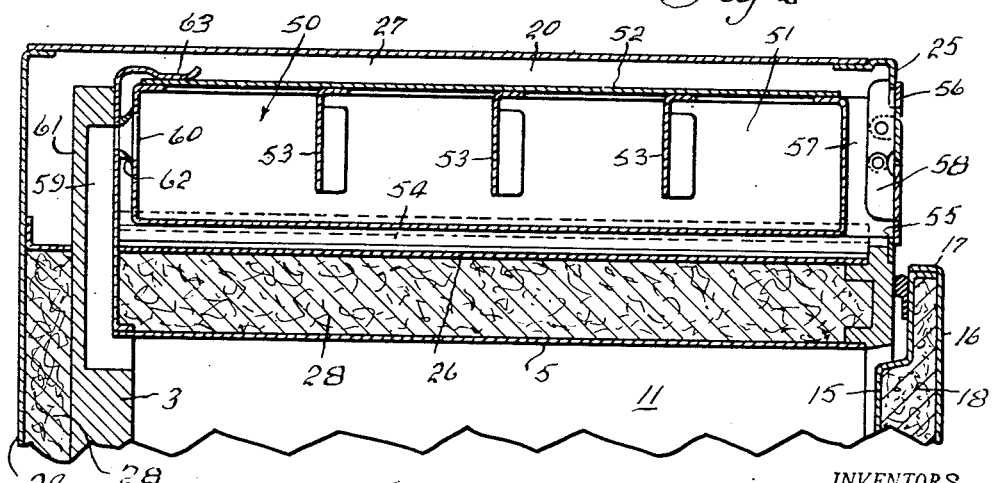
Fig. 4 is a fragmentary vertical section taken on the line 4—4 of Fig. 5.

Referring now to the drawings by reference characters the numeral 1 indicates generally an electric cooking oven constructed according to our invention. The oven 1 comprises a rectangular front frame 2 and a rectangular rear wall 3 which are made of wood or suitable heat insulating plastic material. A sheet metal inner tubular casing 4 having the top wall 5, the bottom wall 6 and the side walls 7 and 8 extends between the front frame 2 and the rear wall 3. The forward end of the inner casing 4 is permanently secured to the inner periphery 9 of the front frame 2 and the rear end thereof is permanently secured about the periphery 10 of the rear wall 3. The frame 2, rear wall 3, and the inner casing 4 define an oven chamber 11 which is open at the forward end thereof. A door 12 is secured to the front frame 2 in position to close the oven chamber 11 by hinge means 13. Latching means 14 is provided to hold the door 12 tightly closed. The door 12 comprises the spaced inner and outer walls 15 and 16 which are connected together by the peripheral wall 17. The space between the inner and outer walls is packed with heat insulating material 18. In order to insure the oven chamber 11 being vapor tight when the door 12 is closed a suitable gasket, against which the door 12 closes, is provided around the open end of the oven chamber 11. An outer tubular casing 19 having the top wall 20, the bottom wall 21 and the side walls 22 and 23 which is secured to and extends rearwardly from the front frame 2 encloses the inner casing 4 and the rear wall 3. The bottom and side walls of the outer tubular casing 19 are permanently secured to the bottom and sides of the frame 2 and the top wall 20 thereof is disposed above the top of the frame 2. The rear end of the outer casing 19 is closed by a sheet metal plate 24 which is spaced from the rear wall 3. The forward end of the outer casing above the frame 2 is closed by a panel 25 which extends upwardly from the top of the frame 2. A sheet metal partition 26 which is secured to and extends rearwardly from the top of the frame 2 within the outer casing 19 provides an upper compartment 27 above the oven chamber 11 within the outer casing 19. The space between the outer casing 19 and the inner casing 4 below the partition 26 is packed with insulating material 28 similar to the insulating material 18 in the door 12.

A plurality of supporting trays generally indicated by the numeral 30 are removably mounted in the oven chamber 11 in vertical spaced relation to each other upon tracks 31 which are permanently secured at the ends thereof to the side walls 7 and 8. The tracks 31, between the ends thereof, are spaced from the side walls 7 and 8 as shown at 32 to permit the upward flow of vapors generated in the oven chamber 11 during use. Each tray 30 comprises two rectangular sheet metal plates 33 and 34 welded together. A zig-zag groove 35, the top of which is closed by the top plate 33, is formed in the bottom plate 34. A pair of long unbroken helical electrical resistance heating elements 36 are embedded in suitable heat conducting electric insulating material in the groove 35. The ends of the heating elements 36 are connected to electric connector plugs 37, which are carried by the trays 30 at the inner end thereof adjacent each side thereof. The plugs 37 carry prongs 38 which enter into electric outlet sockets 39 mounted in the back wall 3. The heating elements 36, when energized, heat the trays 30 which in turn heat the air in the oven chamber 11 and any utensils on the trays 30.

The energization of the heating elements 36 is controlled by switching means 40 which is disposed in a pocket 41 between the top wall 5 of the chamber 11 and the partition 26. The switching means 40 includes a cam shaft 42 having an arm 43 secured to the upper end thereof. The switching means 40 is adapted to be manually closed by rotating the cam shaft 42 through approximately 90° with the arm 43; and to be automatically opened, when the temperature in the oven chamber reaches a predetermined degree, by a thermally responsive element 44 which is subject to the temperature in the oven chamber and is operatively connected to the switching means 40. After each actuation a spring 45 returns the cam shaft 42 to initial position. The switching means 40 which may be adjusted to be opened at any desired temperature of the oven chamber 11 must be again manually closed after each automatic opening thereof by the thermally responsive element 44. Switching means of this general type is available in the open market. Consequently it is thought unnecessary to show and describe this switching means more in detail herein.

In order to prevent the escape of vapors, which are generated during use, from the oven chamber 11, we provide a substantially vapor tight condenser generally indicated by the numeral 50 which is removably mounted in the upper compartment 27. The condenser 50 comprises an elongated receptacle 51 which is rectangular in cross section and is closed by a removable cover 52. A plurality of longitudinally spaced baffles 53 extend from side to side of the receptacle 50 and from the cover 52 downwardly with the lower edges thereof spaced from the bottom of the receptacle. The baffles 53 are permanently secured to the sides of the receptacle 51. The condenser 50 is slidably supported upon a pair of guide rails 54 and is removable from the upper compartment 27 through an opening 55 in the front panel 25. When the condenser 50 is in place within the compartment 27 the opening 55 is closed by a cover plate 56 which is permanently secured to and spaced from the front wall of the receptacle 51 by a pair of connecting links 57. A latch 58 carried by the cover plate 56 holds the condenser 50 in place within the compartment 27. Vapors generated in the oven chamber 11 during use flow up from the top of the chamber 11 through a conduit 59 and into the condenser 50 through an aperture 60 in the rear wall thereof. The conduit 59 is formed in a tongue 61 which is integral with and extends upwardly from the rear wall 3 into the compartment 27 behind the condenser 50. A flexible coupling 62 carried by the tongue 61 connects the upper end of the conduit 59 with the entrance aperture 60 in the condenser. Hot vapors flowing from the oven chamber 11 into the condenser 50 condense upon the baffles 53 and the walls of the receptacle 51 and drip down into the bottom of the receptacle. The condenser 50 should be removed after each use of the oven and the liquid condensed therein emptied out through the aperture 60 in order to insure maximum efficiency of the condenser each time the oven is used. A spring finger 63 carried by the upper end of the tongue 61 holds the rear end of the condenser in place.

In order that an attendant may always know how long a time food in the oven chamber 11 has been cooking and how long a time it will be until the food in the oven is properly cooked we provide an indicating mechanism 70 for visually indicating these periods of time. After the food is properly cooked the indicating mechanism 70 will also indicate how long a time it has been properly cooked. The indicating mechanism 70 is disposed within the compartment 27 and is carried by a closure plate 71 which is removably secured as by screws 72 to the front panel 25 in front of an opening 73 through which the indicating mechanism 70 is inserted into and withdrawn from the compartment 27. The plate 71 has a window 74 therein which is closed by a small pane of clear glass 75 having indicia 76 thereon.

The indicating mechanism 70 comprises a horizontally disposed base plate 80 having the vertical legs 81 and 82 by which the base plate 80 is secured to the closure plate 71. The base plate 80 has a pivot stud 83 secured thereto and extending downwardly from the underside thereof. A circular disc 84 and a lever 85 are pivotally mounted upon the stud 83 and are retained thereon by a nut 86. The forward end of the lever 85 extends out from the compartment 27 through an elongated horizontal slot 87 in the closure plate 71. The rear end of the lever 85 beyond the base plate 71 has a boss 88 on the underside thereof through which a screw 89 is threaded. An ear 90 extends rearwardly from the leg 81 and an ear 91 extends rearwardly from the leg 82. The lower edges of the ears 90 and 91 are spaced from the base plate 80 as shown at 92, and the inner edge of the ear 91 is cut away as shown at 93 to accommodate a vertical arcuate sheet metal shutter 94. An arcuate colored glass plate 95 is carried by and between the ears 90 and 91. The plate 95 is preferably contrastingly colored, the right hand half 96 thereof being one color, for example red, and the left hand half 97 thereof being another color, for example green.

The shutter 94 is disposed between the colored glass plate 95 and the clear glass plate 75 behind the window 74, and is carried by a horizontally disposed swinging sheet metal plate 100 which is pivotally mounted upon a pivot stud 101 which is secured to and extends upwardly from the base plate 80. The swinging plate 100 has an elongated arcuate slot 102 therein. The centers of curvature of the shutter 94, the colored glass 95, and the elongated slot 102 are all in the axis of the pivot stud 101. A spring motor 103 of standard construction is mounted in a casing 104 which is disposed above the swinging plate 102 and is secured to the base plate 80 by bosses 105 which extend downwardly from the casing 104 through the arcuate slot 102 to the base plate 80. The spring motor 103 drives a shaft 106 which extends downwardly from the casing 104 and has an elongated gear 107 secured thereto. The spring motor 103 includes an escape mechanism (not shown) which controls the speed of rotation of the shaft 106 and gear 7 and limits it to approximately one and one-half revolutions per hour. The gear 107 extends down through the elongated slot 102 in the swinging plate 100 and an aperture 108 in the base plate 80, and meshes with a concave arcuate rack 109 formed in one edge of the slot 102, and with a segmental gear section 110 formed in the edge of the disc 84. The disc 84 has a stud 111 secured thereto and extending downwardly therefrom in position to be engaged by one side of the lever 85, and diametrically opposite the gear section 110 the disc 84 has a segmental recess 112 in the periphery thereof.

A snap type switch 115 having the terminals 116 is removably secured by bolts 117 to a bracket 118 which is bolted to the base plate 80 by bolts 119 and extends upwardly therefrom. The switch 115 includes an actuating lever 120 which extends down into the recess 112 in the disc 84 in position to be alternately engaged by the edges 121 and 122 at opposite sides of the recess 112. An electric light bulb 123, the energization of which is controlled by the switch 115, is mounted in position to project light through the colored glass plate 95 and the window 74 when energized.

Figure 5:
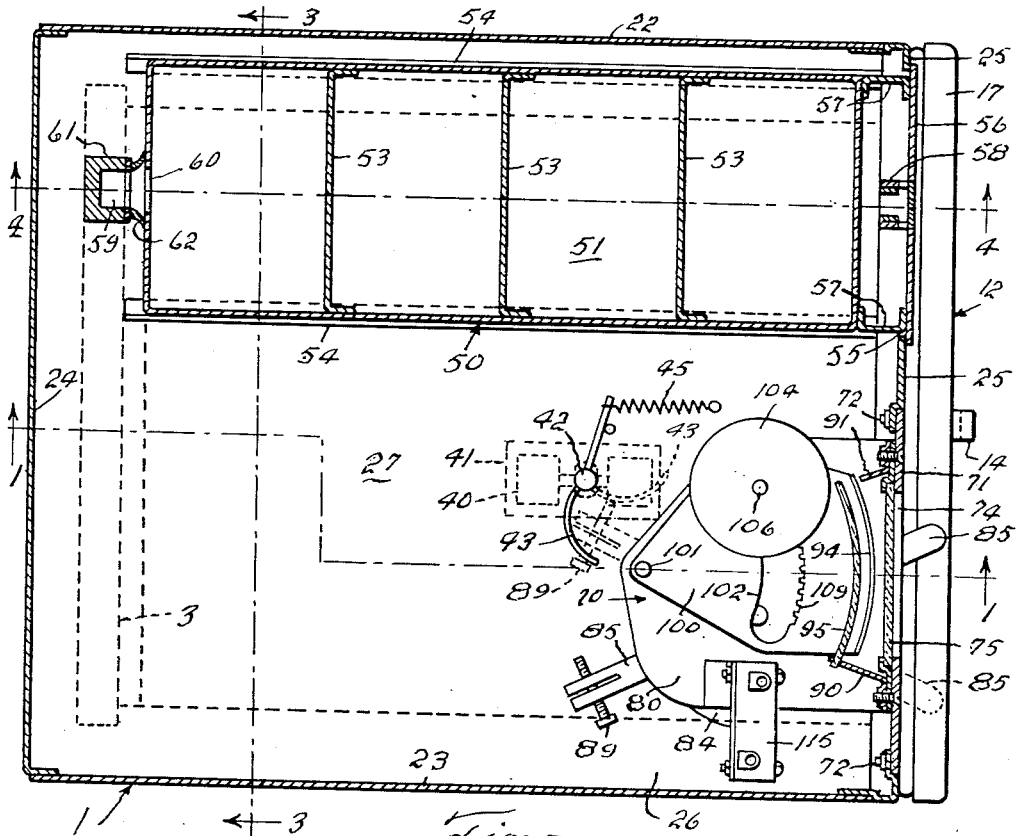
Fig. 5 is a horizontal section taken on the line 5—5 of Fig. 1.
Figure 6:
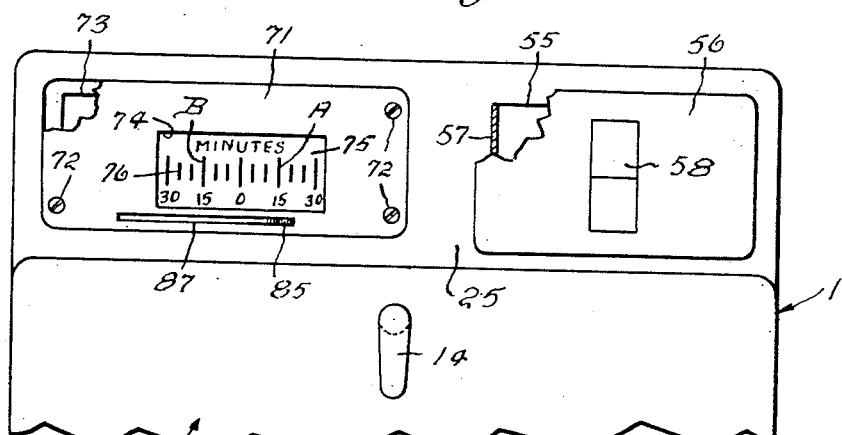
Fig. 6 is a fragmentary front elevation of the upper portion of the oven shown in Figs. 1 to 5.

To initiate operation of the oven the lever 85 is manually rotated clockwise about its pivot 83 from the position shown in full lines in Figs. 5 and 7 to the position shown in dotted lines in Fig. 5 and full lines in Fig. 8. As the lever 85 approaches the end of its movement in this direction the screw 89 carried thereby engages the arm 43 on the control switch shaft 42 and rotates the shaft 42 through approximately 90° which closes the switch 40 and energizes the electric resistance heating elements 36 in the trays 30. During this movement of the lever 85 the lever 85 also engages the stud 111 carried by the disc 84 and rotates the disc 84 through approximately 60° in a clockwise direction from the position shown in Figs. 5 and 7 to slightly beyond the position shown in Fig. 8. At the end of its movement in this direction the edge 121 of the recess 112 in the disc 84 engages the switch lever 120 and moves it from the position shown in Fig. 7 to the position shown in Fig. 8 which closes the switch 115 and energizes the bulb 123. The rotation of the disc 84 in a clockwise direction by the lever 84 will rotate the gear 107 through the segmental gear section 110 a plurality of turns in a counterclockwise direction which will wind up the spring motor 103. The rotation of the gear 107 by the segmental gear 110 on the disc 84 also shifts the swinging plate 100, through the rack 109, from the position shown in Figs. 5 and 7 to a position slightly beyond that shown in Fig. 8. The shifting of the swinging plate 100 removes the shutter 94 carried thereby from between the colored glass plate 95 and the window 74 so that light from the bulb 123 is projected through the plate 95 and window 74. The control switch 40 is now closed and the indicating mechanism 70 is set for operation. The lever 85 is then released and a spring 125 returns it to its initial position. The spring motor 103 now rotates the gear 107 in a clockwise direction which slowly returns the disc 84, the swinging plate 100 and the shutter 94 carried thereby, to their original positions as shown in Figs. 5 and 7. The adjustment of the mechanism is such that this return movement takes approximately one hour; and the adjustment of the thermally responsive element 44 is such that food in the oven chamber 11 will be properly cooked in approximately one-half hour. As the shutter 94 returns to its initial position it gradually cuts off the light being projected through the window 94, and the leading edge 126 thereof registers with the indicia 76 on the window pane 75. As long as both red and green lights are visible through the window 74 one knows that food in the oven chamber 11 is not yet completely cooked and the position of the leading edge 126 of the shutter 94 with respect to the indicia 76 will indicate how long the food has been cooking and how long it will be until the food is completely cooked. When green light alone is visible through the window 74 one knows that the food has been completely cooked, and the position of the leading edge 126 of the shutter 94 with respect to the indicia 76 will indicate how long the food has been completely cooked. For example, assume that the edge 126 of the shutter 94 registers first with the line A of the indicia 76 and then with the line B thereof. When the edge 126 is in register with the line A both red and green light will be visible which indicates that the food is not yet completely cooked and the position of the edge 126 shows that the food has been cooking for fifteen minutes and that it will be fifteen minutes more until the food is completely cooked. When the edge 126 is in register with the line B green light alone will be visible through the window 74 which indicates that the food is completely cooked, and the position of the edge 126 shows that the food has been completely cooked for fifteen minutes.

As the disc 84 approaches its initial position the edge 122 will engage to switch lever 120 and shift it from the position shown in Fig. 8 to the position shown in Fig. 7 thus opening the switch 115 and deenergizing the bulb 123.

While the indicating and control mechanism shown and described herein is particularly adapted for use with the oven shown and described, it per se forms no part of the present invention, but constitutes the subject matter of our co-pending application Serial No. 293,375 filed June 13, 1952.

The outside dimensions of the oven 1 shown herein are approximately 14½ inches deep, 12 inches wide and 16 inches high; and the oven chamber 11 is approximately 11½ inches deep, 9½ inches wide, and 10 inches high. But not withstanding its small size the oven is capable of simultaneously cooking six selected complete meals, each of which consists of five different foods, in one-half hour without any vapors generated during use escaping from the oven.

From the foregoing it will be apparent to those skilled in this art that we have provided a very simple and efficient mechanism for accomplishing the objects of the invention.

It is to be understood that we are not limited to the specific construction shown and described herein as various modifications may be made therein within the scope of the appended claim.

What is claimed is:

A portable vapor tight electric cooking oven comprising a plurality of walls and a door defining a vapor tight cooking chamber and an upper compartment thereabove which is separate from said cooking chamber, a substantially vapor tight condenser removably mounted in said upper compartment, means defining a conduit between the upper end of said cooking chamber and said substantially vapor tight condenser through which vapor escapes from said cooking chamber into said substantially vapor tight condenser, a plurality of imperforate trays removably mounted in said cooking chamber in vertically spaced relation with the peripheral edges thereof spaced from the boundary walls of said cooking chamber and said door to provide uninterrupted paths for the upward flow of vapors, and an electrical resistance heating element incorporated in each of said trays.

References Cited in the file of this patent

UNITED STATES PATENTS

| Number | Name | Date |
| --- | --- | --- |
| 1,118,454 | Weeks | Nov. 24, 1914 |
| 1,178,290 | Berry | Apr. 4, 1916 |
| 2,339,197 | Rutenber | Jan. 11, 1944 |
| 2,472,818 | Gardes | June 14, 1949 |
| 2,556,450 | Schulze | June 12, 1951 |
| 2,556,597 | Pierson | June 12, 1951 |